(12) United States Patent
Cho et al.

(10) Patent No.: US 7,860,504 B2
(45) Date of Patent: Dec. 28, 2010

(54) METHOD OF TREATING HANDOVER IN A BRIDGE-BASED RADIO ACCESS STATION BACKBONE NETWORK

(75) Inventors: Jae-Hun Cho, Seoul (KR); Seong-Taek Hwang, Pyeongtaek-si (KR); Hoon Kim, Suwon-si (KR); Jong-Hee Kim, Seongnam-si (KR); Jong-Ho Yoon, Goyang-si (KR)

(73) Assignees: Samsung Electronics Co., Ltd., Maetan-Dong, Yeongtong-Gu, Suwon-Si, Gyeonggi-Do (KR); University - Industry Cooperation Foundation of Korea Aerospace University of Korea Aerospace University, Hwajeon-Dong, Deokyang-Gu, Goyang-Si, Gyeonggi-Do (KR)

( * ) Notice: Subject to any disclaimer, the term of this patent is extended or adjusted under 35 U.S.C. 154(b) by 794 days.

(21) Appl. No.: 11/893,801

(22) Filed: Aug. 17, 2007

(65) Prior Publication Data

US 2008/0045221 A1 Feb. 21, 2008

(30) Foreign Application Priority Data

Aug. 17, 2006 (KR) .................... 10-2006-0077769

(51) Int. Cl.
*H04W 36/00* (2009.01)

(52) U.S. Cl. ............. 455/439; 455/432.1; 455/41.1; 455/41.2; 370/331; 370/350; 370/356; 370/357

(58) Field of Classification Search ............ 455/439, 455/432.1–445, 41.1, 41.2; 370/331–334, 370/350–357, 338, 401
See application file for complete search history.

(56) References Cited

U.S. PATENT DOCUMENTS

| 2004/0064581 | A1* | 4/2004 | Shitama et al. | 709/238 |
| 2004/0213181 | A1* | 10/2004 | Grech et al. | 370/331 |
| 2006/0002407 | A1* | 1/2006 | Sakamoto | 370/402 |
| 2006/0193272 | A1* | 8/2006 | Chou et al. | 370/310 |
| 2006/0268780 | A1* | 11/2006 | Chou et al. | 370/331 |

FOREIGN PATENT DOCUMENTS

| KR | 2005-103240 | 10/2005 |
| KR | 2005-118773 | 12/2005 |

* cited by examiner

*Primary Examiner*—Lewis G West
*Assistant Examiner*—Michael Nguyen
(74) *Attorney, Agent, or Firm*—Cha & Reiter, LLC

(57) ABSTRACT

A method of treating a handover in a bridge-based radio access station backbone network including a plurality of base station bridges each including a two-tiered switch connected with a plurality of radio access stations, a plurality of SCBs (Site Core Bridges) each composed of two-tiered switch for constituting the core network, and an HLR (Home Location Register) for managing the structural information of the network constituents. The SCB stores the terminal information containing the receiving address of the initial terminal registration message and the SCB to delete the terminal information in response to a disconnection message of the terminal caused by handover, to request the SCBs in the terminal end of the old MAC-in-MAC tunnel to delete the tunnel information and the terminal information, and to inform the HLR of initiating the handover to change the registered operational state of the terminal.

10 Claims, 5 Drawing Sheets

METHOD OF TREATING HANDOVER IN A BRIDGE-BASED RADIO ACCESS STATION BACKBONE NETWORK

CLAIM OF PRIORITY

This application claims priority under 35 U.S.C. §119 from an application entitled "Method of Treating Handover in a Bridge-based Radio Access Station Backbone Network," filed in the Korean Intellectual Property Office on Aug. 17, 2006 and assigned Serial No. 2006-77769, the contents of which are hereby incorporated by reference herein in its entirety.

BACKGROUND OF THE INVENTION

1. Field of the Invention

The present invention relates to extending Ethernet technology. More particularly, the present invention relates to a method of treating a handover in a bridge-based radio access station backbone network that employs Ethernet technology.

2. Description of the Related Art

Ethernet is a networking technology most generally used for LANs (Local Area Networks). The simple structure and generality of Ethernet technology has spurred innovations to extend its applicability for both very small LANs and WANs (Wide Area Networks). FIG. 1 is a schematic diagram that illustrates the structure of an example of the conventional WiBro (wireless broadband) radio access station backbone network, which comprises a plurality of RASs (Radio Access Stations) 10 and a plurality of ACRs (Access Control Routers) 12. The WiBro network includes a home agent (not shown) for supporting the IP (Internet Protocol) mobility of a terminal, and an AAA (Authentication, Authorization and Accounting) server 14 for performing the authentication, authorization and accounting of the users and terminals in order to provide network access and services to authorized users.

The RASs 10 are allotted with respective service cells, each RAS providing communication services for a variety of types of customer equipment 11, such as mobile communication terminal, PDA, and a notebook device. The RAS 10 serves to mediate signals between the mobile communications terminal 11 through radio channels. In addition, the RAS 10 is connected through a wired channel to an ACR (Access Control Router) 12 forming an IP subnet. The wirelessly transmitted signal from the terminal 11 is packaged by the RAS 10 into an IP packet transferred to an upper ACR 12', which switches the IP packet to another ACR 12" adjacent to the target terminal according to the IP address of the target terminal. Thus, the conventional RAS backbone network performs communication services by transmitting the IP packets to the target designated by an IP address.

However, the conventional RAS backbone network has been structured chiefly by employing three-tiered routers, relatively complicated to the point that results in ineffective network control, including delayed handover because of three-tiered handover operations.

SUMMARY OF THE INVENTION

The present invention provides a method of treating handovers in a bridge-based RAS backbone network that effectively simplifies and facilitates the network control as compared with conventional RAS backbone networks. It is also an object of the present invention to achieve fast handover by employing two-tiered Ethernet bridges.

According to an aspect of the present invention, a method of treating handover in a bridge-based radio access station backbone network including a plurality of base station bridges each composed a of two-tired switch connected with a plurality of radio access stations, a plurality of Site Core Bridges (SCBs) each composed of a two-tiered switch for constituting the core network, and an Home Location Register (HLR) for managing the structural information of the network constituents, including the steps of causing the SCB to store the terminal information containing the receiving address of the initial terminal registration message or route update message of a terminal including the Media Access Control (MAC) and IP addresses of the terminal, so as to send the terminal information and its own MAC address to the HLR to register the location information notifying to which SCB the terminal belongs and the terminal information; the SCB to deleting the terminal information in response to a disconnection message of the terminal caused by handover, to request the SCBs in the terminal end of the old MAC-in-MAC tunnel to delete the tunnel information and the terminal information, and to inform the HLR of initiating the handover to change the registered operational state of the terminal; and the SCB as a crossover bridge deleting the tunnel information and the terminal information of the terminal upon request of the opposite SCB and to query the HLR of the location information of the terminal so as to receive the information of a new SCB to which the terminal belongs, thereby restarting the frame mediation with the new SCB.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Figure 1:
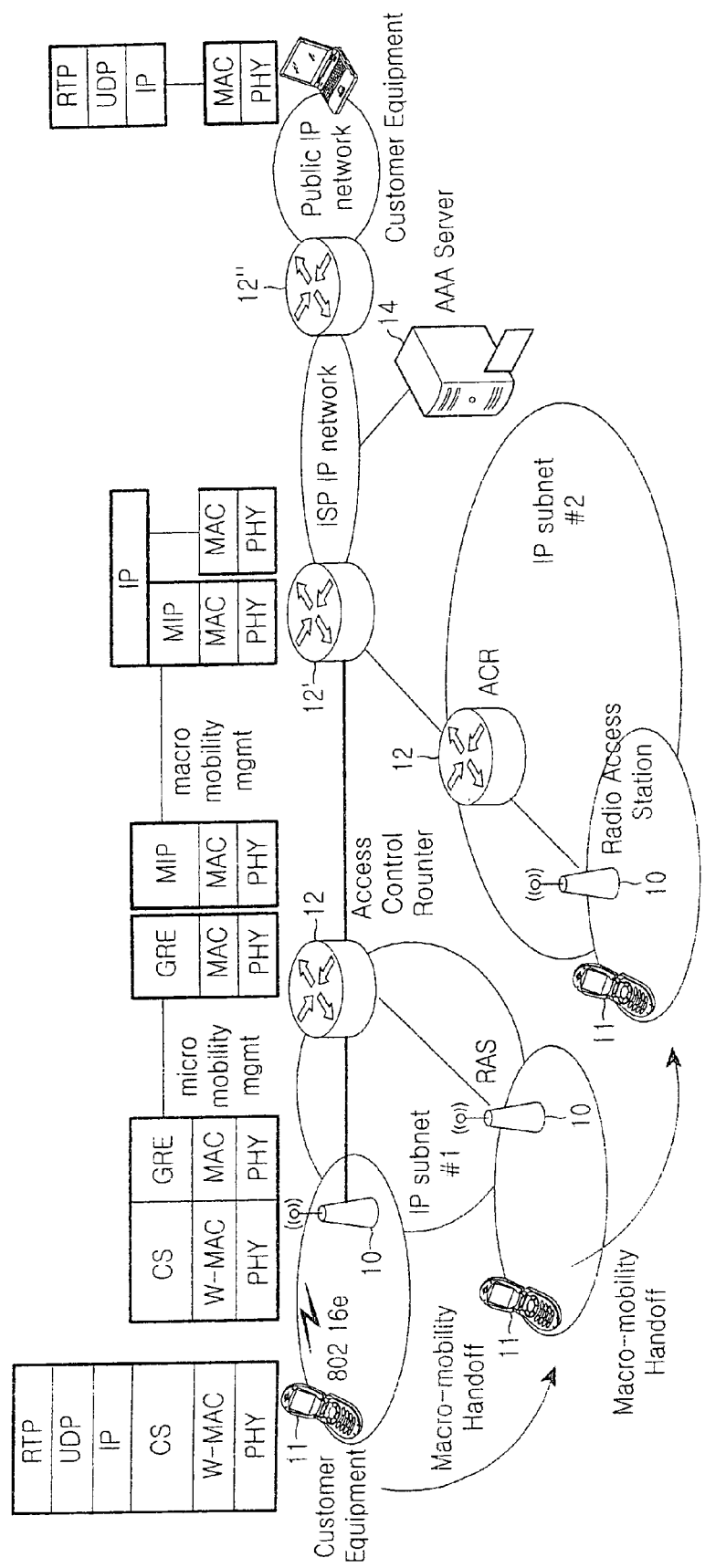
FIG. 1 is a schematic diagram for illustrating the structure of a conventional WiBro RAS backbone network.

Now, embodiments of the present invention will be described herein below with reference to the accompanying drawings, which are presented for purposes of illustration and not to limit the invention in any way to the examples shown therein. In the drawings, the same or similar elements are denoted by the same reference numerals even though they are depicted in different drawings. For the purposes of clarity and simplicity, well-known functions or constructions are not described in detail as they would obscure the invention with unnecessary detail.

Figure 2:
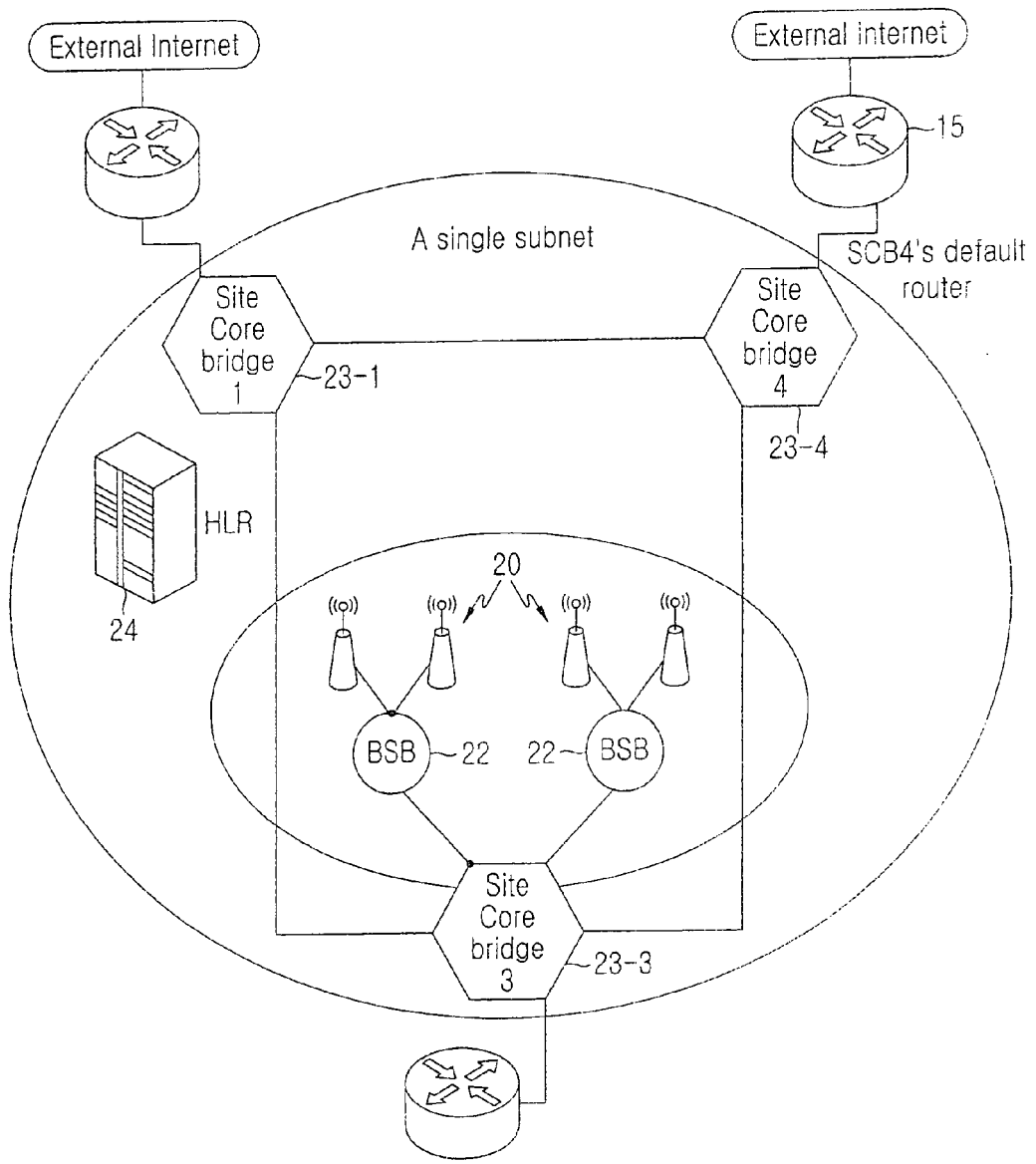
FIG. 2 is a schematic diagram for illustrating the structure of a bridge-based RAS backbone network according to the present invention.

Referring to FIG. 2, a bridge-based RAS backbone network according to the present invention comprises one or more mobile nodes (MN, not shown), RASs 20, Base Station Bridges (BSBs) 22, Site Core Bridges (SCBs) 23-*x*, Home Location Register (HLR) 24, and external routers 15.

Each of the BSBs 22 comprises a bridge including a two-tiered switch connected to the RAS 20 while each of the SCBs 22 comprises a bridge comprising a two-tiered switch constituting the core network. The HLR 24 is a server for managing the structural information of the network constituent, which stores, preferably in a format table, the IP address of every MN presently turned on, the MAC (Media Access Control) address, and the address of the SCB to which the corresponding MN belongs.

As shown in FIG. 2, the RAS backbone network shown has each SCB 23-*x* keeping static the MAC address of the external default router 15 connected thereto in order to mediate the egress frame (the frame entering SCB). The MAC address of the default router 15 is statically set in the SCB 23-*x* to eliminate the network traffic caused by the ARP frame. An advantage is that it is not necessary to inquire of the MAC address by means of the ARP frame. In addition, each individual MAC address is statically registered in the other SCBs existing in the core network by employing an 802.1ak MRP (Multiple Registration Protocol). There are multiple reasons for the static registration of the MAC address, which are discussed herein below. First, the SCBs constitute the core of the RAS backbone network that is hardly altered, even in alteration of the radio cell, such as when adding a cell. Second, the static registration of the MAC address makes it easier for the network operator to manually set the SCB, thereby eliminating the necessity of the address learning function. Thus, each SCB will get to know the MAC addresses of the other SCBs existing in the core network.

Figure 3:
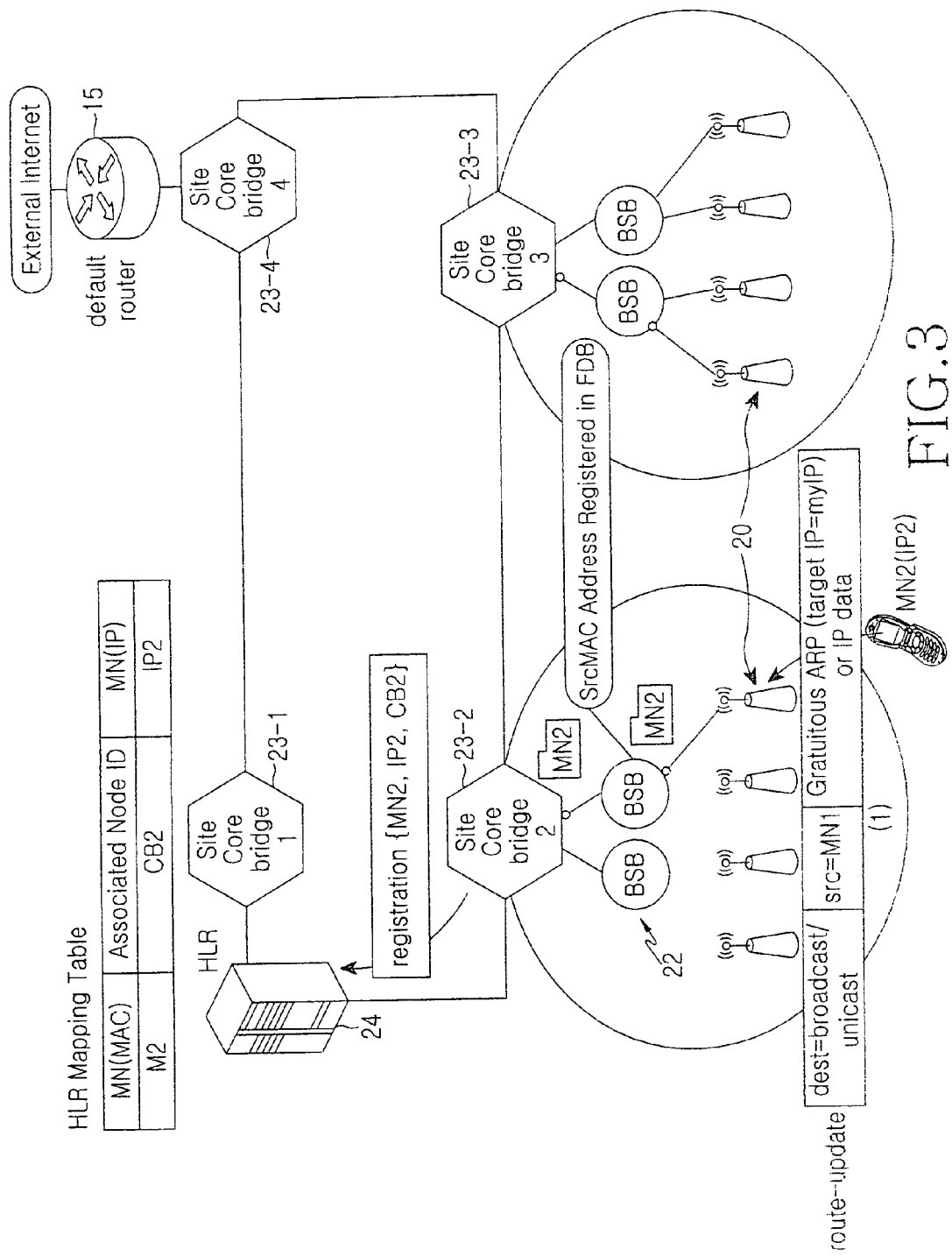
FIG. 3 is a schematic diagram that illustrates the initial registration of a mobile node in the bridge-based RAS backbone network shown in FIG. 2.

Now referring to FIG. 3, the procedure of initially registering a terminal in the RAS backbone network of FIG. 2 is described. In the first step [1], when each terminal MN2 initially accesses the network, it sends a gratuitous ARP frame enclosing its own information of the MAC and IP addresses to the corresponding BSB 22, so that it may be registered in the FDB (Filtering Database) of each of the bridges BSB and SCB by transmitting the ARP frame to SCB 23-2. In the second step [2], the corresponding SCB 23-2 sends the information of the terminal MS2 including the MAC address, IP address, and SCB MAC address to the HLR 24 to register the positional and other corresponding information representing to which SCB the to-be registered terminal belongs. In this case, the SCB 23-*x* uses the new message obtained by transforming 802.1 registration protocol for a unicast or UDP (User Datagram Protocol) based registration message for registration in the HLR 24. Referring to FIG. 3, there is shown an example of an HLR Mapping Table (above HLR 24) that shows the table registering the MAC address of the terminal MN2 requesting the registration as M2, associated node (associated SCB) ID CB2, and the IP address of the terminal as IP2.

In such a RAS backbone network, if a particular terminal transmits an ARP frame to request the MAC address of a target terminal for communication, the corresponding SCB inquires into the HLR 24 to get the MAC address of the target terminal delivered to the particular terminal in response to the ARP frame. In this case, the target terminal may belong to the same SCB or a different SCB. If the target terminal does not belong to the same SCB, the corresponding SCB may get, via the HLR 24, the MAC address of the SCB to which the target terminal belongs, so that frames are transferred between both SCBs in MAC-in-MAC.

Meanwhile, while referring to the RAS backbone network shown in FIG. 2, if the target terminal exists in a different external network, each terminal asks the ARP for its own default gateway toward the external network. Then, the corresponding SCB provides the ARP response by using the information of the default gateway already retrieved, thereby enabling the terminal to communicate through the external network. In addition, when asked by a router for the ARP to provide the IP address of the target terminal in the external network, the SCB connected to the external network inquires into the HLR 24 to get the MAC address of the SCB to which the target terminal belongs, as well as the MAC address of the target terminal delivered to the router as the ARP response. Of course, the SCB connected to the external network may broadcast the ARP request from the router inside the network. Thus, the router gets the MAC address of the target terminal by the ARP response to normally mediate the IP packet, such that each SCB may mediate the frames to the corresponding SCB in MAC-in-MAC according to the MAC address of the target terminal already obtained and the MAC address of the SCB to which the target terminal belongs.

Still referring to FIG. 2, the RAC backbone network 2 comprises Ethernet bridges instead of conventional routers, thereby simplifying the network so as to facilitate management of the network, and expediting the handover due to two-tiered handover operation. Hereinafter, in connection with the attached drawings, the handover operation according to the present invention shall be described in more detail.

Figure 4:
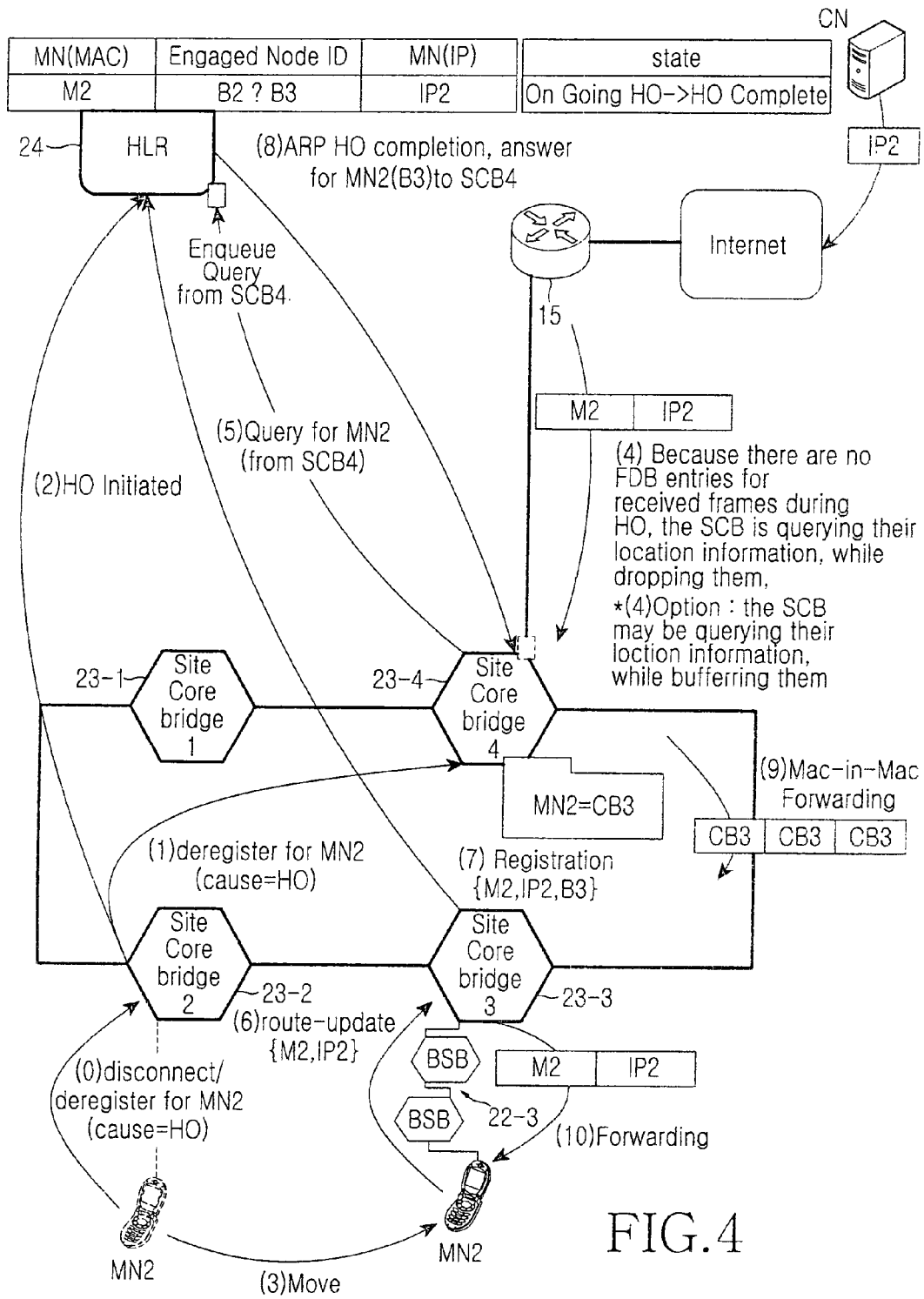
FIG. 4 is a schematic diagram that illustrates a procedure for performing a hard handover according to an embodiment of the present invention in the bridge-based RAS backbone network shown in FIG. 2.

FIG. 4 shows a non-limiting example of the procedure for performing a hard handover according to an embodiment of the present invention utilizing a network similar to the RAS backbone network of FIG. 2. As shown in FIG. 4, a mobile node MN2 is moved from the second SCB 23-2 to the third SCB 23-3. More specifically, the fourth SCB 23-4 (crossover bridge) connected to the default router 15 changes the mediation route from the second SCB 23-2 to the third SCB 23-3 because the mobile node MN2 moves to a place under the control of the third SCB 23-3. As shown in FIG. 4, the hard handover is achieved by establishing a new connection in a new BSB after cancelling the old BSB and SCB that were previously connected with the terminal, as well as the old tunnel connecting the SCB associated with the terminal, and the SCB mediating the frame thereto.

Still referring to FIG. 4, the terminal or mobile node MN2 disconnects with the old BSB through the steps [0] to [2]. Firstly in the step [0], the terminal MN2 sends a disconnection message (shown above MN2) for handover to the old SCB 23-2, thereby causing the deletion of the table item registering the terminal MN2 from the bridges existing in the transmission course through the old SCB 23-2. Then in the second step [1], the old SCB 23-2 receiving the disconnection message requests the SCBs 23-4 or 23-3 and 4 in the terminal end of the old MAC-in-MAC tunnel to delete the information relating to both the tunnel and the terminal. Subsequently, in the third step [2], the old SCB 23-2 informs the HLR 24 of initiating the handover of the terminal MN2 so that the HLR 24 may change the registered operational state of the terminal MN2 from the active to the handover state. Thereafter, as shown in FIG. 4, the terminal MN2 moves to the new BSB 22-3 and SCB in step [3].

Meanwhile, as the information has been deleted from the information of the terminal MN2 from the FDB, the fourth SCB 23-4 then eliminates the frame received during the handover in step [4], and in step [5] queries the HLR 24 of the location information of the terminal MN2.

Alternatively, instead of eliminating the frame, the fourth SCB 23-4 may buffer the frame so as to be forwarded to the new SCB, thereby preventing the loss of the frame. In this case, the HLR 24 delays a response to the fourth SCB 23-4 since the new SCB is not determined during the handover of the terminal MN2.

Still referring to FIG. 4, in step [6], after completing the movement to the new BSB 22-3, the terminal MN2 carries out the registration procedure similar to as discussed in conjunction with FIG. 3. Namely, the terminal MN2 sends a route update message containing its MAC address M2 and IP address IP2 through the new BSB 22-3 to the new SCB 23-3.

Now referring to step [7], the new SCB 23-3, which has received the route message from the terminal MN2, proceeds to send a registration message to the HLR 24 to revise the location registration of the terminal MN2. Next, at step [8], once recognizing the revised location registration of the terminal MN2 to be caused by the completion of handover, the HLR 24 sends a message enclosing the information of the new SCB 23-3 connected with the terminal MN2 to the fourth SCB 23-4 in response to the previous query of step [5]. Then in step [9], the fourth SCB 23-4 performs the MAC-in-MAC tunneling to add the MAC header representing the MAC address of the new SCB 23-3 to send the corresponding frames to the new SCB 23-3 of the terminal MN2 notified by the response message.

Still referring to FIG. 4, at step [10], the new SCB 23-3 finally removes the MAC header from the frame delivered to the terminal MN2.

Figure 5:
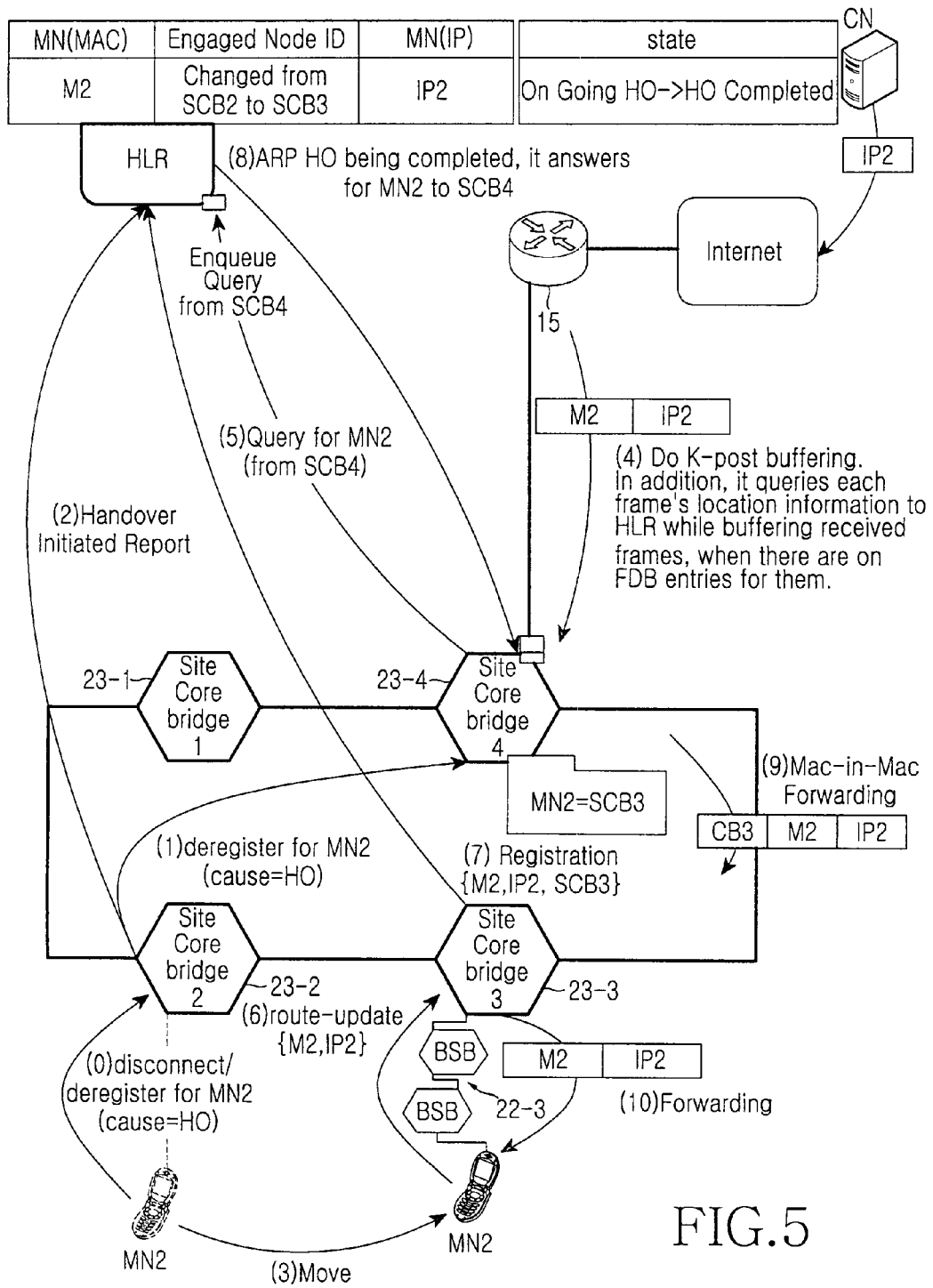
FIG. 5 is a schematic diagram that illustrates a procedure for performing a soft handover according to an exemplary embodiment of the present invention in the bridge-based RAS backbone network shown in FIG. 2.

FIG. 5 illustrates a process of performing a soft handover according to another exemplary embodiment of the present invention in the RAS backbone network as shown in FIG. 2. Similar to the concept of the hard handover method depicted in FIG. 4, there is commonality in that the terminal MN2 moves from the second SCB 23-2 to the third SCB 23-3, and the fourth SCB 23-4 (crossover bridge) connected to the default router 15 also changes the mediation route from the second SCB 23-2 to the third SCB 23-3. This soft handover operation prevents loss of the on-the-fly frame that may occur during handover. To accomplish this end, each bridge employs what is referred to as k-post buffering to temporarily store the maximum k number (e.g., 3) of the frames lately received, and the other operations are the same as in the hard handover shown in FIG. 4. The soft handover that is shown in FIG. 5 can be referred to as a semi-soft handover because it cannot physically connect two BSBs as in the mobile communications network.

With reference to the connection shown in FIG. 5, firstly in the step [0], the terminal MN2 sends a disconnection message for handover to the old SCB 23-2 to cause deletion of the table item listing the registration of the terminal MN2 from the bridges existing in the transmission course through the old SCB 23-2. Then in the second step [1], the old SCB 23-2 that receives the disconnection message then requests the SCBs 23-4 or 23-3 and 4 in the terminal end of the old MAC-in-MAC tunnel to delete the information relating to both the tunnel and the terminal. Next, in the third step [2], the old SCB 23-2 informs the HLR 24 of initiating the handover of the terminal MN2, so that the HLR 24 may change the registered operational state of the terminal MN2 from the active state to the handover state. Thereafter, similar to as shown in FIG. 4, the terminal MN2 moves to the new BSB 22-3 in step [3].

Meanwhile, because the information of the terminal MN2 has been deleted from the FDB, the fourth SCB 23-4 eliminates the frame received during the handover in step [4], then querying the HLR 24 of the location information of the terminal MN2 in step [5]. In addition, the fourth SCB 23-4 buffers k frames previously received. In this case, the HLR 24 delays a response to the fourth SCB 23-4 since the new SCB has not yet been determined during the handover of the terminal MN2.

Thereafter in step [6], after completing the movement to the new BSB 22-3, the terminal MN2 carries out a registration procedure similar to that described in conjunction with FIG. 3. Namely, the terminal MN2 sends a route update message containing its MAC address M2 and IP address IP2 through the new BSB 22-3 to the new SCB 23-3.

Still referring to FIG. 5, in step [7], the new SCB 23-3, which has received the route message from the terminal MN2, sends a registration message to the HLR 24 for revising the location registration of the terminal MN2. Subsequently in step [8], recognizing the revised location registration of the terminal MN2 will be caused by the completion of the handover, the HLR 24 sends a message enclosing the information of the new SCB 23-3 connected with the terminal MN2 to the fourth SCB 23-4 in response to the previous query in step [5]. Then in step [9], the fourth SCB 23-4 performs the MAC-in-MAC tunneling to add the MAC header representing the MAC address of the new SCB 23-3 to send the buffered frames (i.e., the frames buffered again from the k transmission-completed frames) to the new SCB 23-3 of the terminal MN2 notified by the response message. Finally in step [10], the new SCB 23-3 removes the MAC header from the frame delivered to the terminal MN2 to complete the process.

According to the present invention, if the fourth SCB 23-4 buffers three transmission-completed frames (sequentially numbered 0, 1, 2), and the frame numbered 2 of the on-the-fly frames is lost, the terminal MN2 can receive a retransmission of all the frames numbered 0, 1 and 2, thereby not losing the frame numbered 2. Of course, the terminal MN2 deletes the frames numbered 0 and 1 having been received from the previous site (the second site) in order to avoid duplicity, continuing to receive the frames including that numbered 2.

Moreover, according to the process as described in connection with FIG. 5, the terminal may receive doubly transmitted frames, or a duplicated part of a frame, but the duplicated frames are removed by the serial numbers of the upper layer protocol, so that all the frames may be continuously received without frame loss. Moreover, in order to effectively treat the doubled transmission of frames, each transmitted frame is sequentially numbered in the L2 layer. Subsequently, the terminal records the number of the frame last received into the route update message transmitted, so that the crossover bridge may retransmit the buffered transmission-completed frames starting after the last received frame, if necessary.

Thus the invention provides a method of treating handover in a bridge-based RAS backbone network, which effectively simplifies and facilitates the network control so as to achieve fast handover by employing two-tiered Ethernet bridges. While the invention has been shown and described with reference to a certain preferred embodiment thereof, it will be understood by those skilled in the art that various changes in form and details may be made therein without departing from the spirit of the invention and the scope of appended claims.

What is claimed is:

1. A method of treating a handover in a bridge-based radio access station backbone network that includes a plurality of base station bridges each comprising a two-tiered switch connected to a plurality of radio access stations, a plurality of Site Core Bridges (SCBs) each comprising a two-tiered switch which constitutes the core network, and a Home Location Register (HLR) for managing the structural information of the network constituents, said method comprising the steps of:

storing terminal information by one SCB of said plurality of SCBs, said terminal information containing a receiving address of an initial terminal registration message or a route update message of a terminal including a Media Access Control (MAC) and IP addresses of said terminal and to send said terminal information and its own MAC address to said HLR to register the location information notifying to which SCB said terminal belongs and said terminal information;

deleting terminal information by said SCB in response to a disconnection message of said terminal caused by handover, including requesting the SCBs in the terminal end of the old MAC-in-MAC tunnel to delete the tunnel information and said terminal information, and informing said HLR of initiating said handover to change the registered operational state of said terminal; and deleting the tunnel information and the terminal information of the terminal by said SCB operating as a crossover bridge upon request of an opposite SCB and to query said HLR of the location information of said terminal so as to receive the information of a new SCB to which said terminal belongs, thereby restarting the frame mediation with said new SCB.

2. The method according to claim 1, wherein said SCB operating as the crossover bridge removes the frames mediated to said terminal while querying said HLR of the location information of said terminal for receiving the information of the new SCB to which said terminal belongs.

3. The method according to claim 1, wherein said SCB operating as the crossover bridge buffers the frames mediated to said terminal while querying said HLR of the location information of said terminal for receiving the information of the new SCB to which said terminal belongs, so as to transmit the buffered frames upon restarting the frame mediation with said new SCB.

4. The method according to claim 1, wherein said SCB operating as the crossover bridge buffers a predetermined number of the late transmission-completed frames for retransmitting the buffered frames upon restarting the frame mediation with said new SCB.

5. A method of treating handover in a bridge-based radio access station backbone network including a plurality of base station bridges each comprising a two-tiered switch connected with a plurality of radio access stations, a plurality of SCBs (Site Core Bridges) each comprising a two-tiered switch for constituting the core network, and an HLR (Home Location Register) for managing the structural information of the network constituents, said method comprising the steps of:

storing the terminal information by said SCB containing the receiving address of the initial terminal registration message or route update message of a terminal including the Media Access Control (MAC) and IP addresses of the terminal, and to send said terminal information and its own MAC address of the terminal to said HLR to register the location information notifying to which SCB said terminal belongs and said terminal information;

deleting said terminal information by said SCB in response to a disconnection message of said terminal caused by the handover, requesting the SCBs in the terminal end of the old MAC-in-MAC tunnel to delete the tunnel information and said terminal information, and informing said HLR of initiating said handover to change the registered operational state of said terminal;

buffering a predetermined number of the late transmission-completed frames, by operating said SCB as a crossover bridge to delete the tunnel information and the terminal information of the terminal upon request of the opposite SCB, and to query said HLR of the location information of said terminal so as to receive the information of a new SCB to which said terminal belongs; and restarting the frame mediation by retransmitting selected ones of said buffered frames to said new SCB.

6. The method according to claim 2, wherein said terminal receiving the retransmitted frames removes the frames doubly received so as to continuously receive all the frames without any frame loss.

7. The method according to claim 5, wherein the retransmission of the selected ones of said buffered transmission-completed frames is for retransmitting the frames starting after the last frame received by said terminal by detecting the preset information indicating the last received frame or the next coming frame of said terminal provided in the handover completion signal.

8. The method according to claim 6, wherein the retransmission of the selected ones of said buffered transmission-completed frames is for retransmitting the frames starting after the last frame received by said terminal by detecting the preset information indicating the last received frame or the next coming frame of said terminal provided in the handover completion signal.

9. The method according to claim 1, wherein said HLR registers the location information of said terminal in an HLR mapping table.

10. The method according to claim 5, wherein said HLR registers the location information of said terminal in an HLR mapping table.

* * * * *